(12) United States Patent
Sun et al.

(10) Patent No.: US 9,589,700 B2
(45) Date of Patent: Mar. 7, 2017

(54) CROSS-LINKED POLYETHYLENE COMPOSITIONS

(75) Inventors: Ka Ram Sun, Busan (KR); In Gyu Park, Daejeon (KR); Youn Sun Nam, Daejeon (KR); Young Il Song, Daejeon (KR); Sang Rok Do, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 14/124,300

(22) PCT Filed: Jul. 31, 2012

(86) PCT No.: PCT/KR2012/006084
§ 371 (c)(1),
(2), (4) Date: Dec. 6, 2013

(87) PCT Pub. No.: WO2013/022206
PCT Pub. Date: Feb. 14, 2013

(65) Prior Publication Data
US 2014/0113133 A1    Apr. 24, 2014

(30) Foreign Application Priority Data

Aug. 8, 2011  (KR) .................. 10-2011-0078715
Jul. 26, 2012  (KR) .................. 10-2012-0081616

(51) Int. Cl.
*H01B 3/44* (2006.01)
*H01B 7/28* (2006.01)
(Continued)

(52) U.S. Cl.
CPC .......... *H01B 3/441* (2013.01); *H01B 7/2813* (2013.01); *C08K 5/01* (2013.01); *C08K 5/13* (2013.01);
(Continued)

(58) Field of Classification Search
CPC ...... C08F 255/00; C08F 230/08; C08K 5/549; C08K 5/5425; C08K 5/0091; C08K 5/14;
(Continued)

(56) References Cited

U.S. PATENT DOCUMENTS 3,484,540 A * 12/1969 Brunelle et al. .......... 174/120 R
4,900,792 A   2/1990 Chen et al.
(Continued)

FOREIGN PATENT DOCUMENTS

JP    63187503 A    8/1988
JP    05-078530     3/1993
(Continued)

OTHER PUBLICATIONS

Machine Translation of JP 2010-121056A (2010).*
Hanley T L et al: "A general review of polymeric insulation for use in HVDC cables", IEEE Electrical Insulation Magazine, IEEE Service Center, New York, NY, US, vol. 11, No. 1, Jan. 1, 2003 (Jan. 1, 2003), pp. 13-24, XP011264863, ISSN: 0883-7554.
Pricilla Lepoutre: "The Manufacture of Polyethylene", May 24, 2006 (May 24, 2006), pp. 1-5, XP055166264, Retrieved from the Internet: URL: http://nzic.org.nz/ChemProcesses/polymers/10J.pdf [retrieved on Jan. 30, 2015].

*Primary Examiner* — Scott R Walshon
(74) *Attorney, Agent, or Firm* — Dentons US LLP (57) ABSTRACT

A cross-linked polyethylene composition for a power cable insulator including (A) 100 parts by weight of a polyethylene base resin, (B) 0.1 to 0.6 parts by weight of a hindered phenol-based antioxidant, (C) 1 to 4 parts by weight of a crosslinking agent, (D) 0.2 to 1.0 parts by weight of magnesium oxide and (E) 0.1 to 1.0 parts by weight of a scorch inhibitor, which advantageously exhibits superior resistance to water tree generated when a power cable insulator is exposed to outside water and electric field, and superior electrical insulation characteristics.

9 Claims, 2 Drawing Sheets (51) Int. Cl.
*C08K 3/22* (2006.01)
*C08K 5/01* (2006.01)
*C08K 5/134* (2006.01)
*C08K 5/375* (2006.01)
*C08K 5/13* (2006.01)

(52) U.S. Cl.
CPC ............ *C08K 5/1345* (2013.01); *C08K 5/375* (2013.01); *C08K 2003/222* (2013.01); *C08K 2003/2217* (2013.01); *C08L 2203/202* (2013.01); *C08L 2312/00* (2013.01); *Y10T 428/2933* (2015.01)

(58) Field of Classification Search
CPC ........ C08K 5/372; C08K 5/00; C08K 5/0075; C08K 5/375; C08K 3/0033; C08K 7/00; C08K 5/01; C08K 2003/222; H01B 3/441; H01B 3/443; H01B 9/027; H01B 7/2813; H01B 3/44; H01B 3/28; H01B 1/24; H01B 3/22; C08L 23/02; C08L 23/06; C08L 23/08; C08L 23/12; C08L 23/20; C08L 9/00; C08L 101/00; C08L 33/02; C08L 21/00; C08L 7/00; C08L 23/04; C08L 23/18; C08L 67/04; C08L 71/02; C08L 2203/202; C08L 2666/22; C08L 2666/18; H02G 15/003; H02G 15/103; B82Y 30/00
USPC ........................ 428/375, 379, 383, 378, 374; 174/110 PM, 110 AR, 129 R, 73.1, 174/110 SR, 113 R, 120 SR, 116, 174/120 SC; 524/570, 574, 579, 582, 524/585, 240, 330; 525/263
See application file for complete search history.

(56) References Cited

U.S. PATENT DOCUMENTS

| | | | |
|---|---|---|---|
| 6,103,374 A * | 8/2000 | Keogh ................. | C08K 5/0025 174/110 PM |
| 6,203,907 B1* | 3/2001 | Keogh .......................... | 428/379 |
| 6,586,509 B1 | 7/2003 | Bostrom et al. | |
| 6,869,995 B2* | 3/2005 | Caronia et al. ............... | 524/330 |
| 2009/0247678 A1 | 10/2009 | Lee et al. | |
| 2010/0036031 A1 | 2/2010 | Herbst et al. | |
| 2010/0212930 A1* | 8/2010 | Yasumoto et al. ...... | 174/110 SR |
| 2010/0230131 A1* | 9/2010 | Han et al. .............. | 174/110 PM |

FOREIGN PATENT DOCUMENTS

| | | | |
|---|---|---|---|
| JP | 63-150811 B1 | | 11/1995 |
| JP | 10-64339 B1 | | 3/1998 |
| JP | 2007103247 A | * | 4/2007 |
| JP | 2010121056 A | | 6/2010 |
| KR | 10-2000-0061604 | | 10/2000 |
| KR | 1020020079525 A | | 10/2002 |
| KR | 100718022 B1 | | 5/2007 |
| KR | 10-0561272 B1 | | 11/2013 |
| WO | 9933069 A1 | | 7/1999 |
| WO | WO 2007123331 A1 | * | 11/2007 |
| WO | WO 2008143129 A1 | * | 11/2008 |
| WO | 2011057927 A1 | | 5/2011 |

* cited by examiner

CROSS-LINKED POLYETHYLENE COMPOSITIONS

This application is a national stage application of International Application No. PCT/KR2012/006084, filed on Jul. 31, 2012, which claims priority to and the benefit of Korean Patent Application Nos. 10-2011-0078715, filed Aug. 8, 2011, and 10-2012-0081616, filed Jul. 26, 2012, in the Korean Intellectual Property Office, the entire contents of which are incorporated herein by reference.

TECHNICAL FIELD

The present invention relates to a cross-linked polyethylene composition. More specifically, the present invention relates to a cross-linked polyethylene composition which comprises (A) 100 parts by weight of a polyethylene base resin, (B) 0.1 to 0.6 parts by weight of a hindered phenol-based antioxidant, (C) 1 to 4 parts by weight of a crosslinking agent, (D) 0.2 to 1.9 parts by weight of magnesium oxide, and (E) 0.1 to 1.0 parts by weight of a scorch inhibitor, thus exhibiting superior resistance to water tree generated when a power cable insulator is exposed to outside water and electric field, and superior electrical insulation characteristics.

BACKGROUND ART

Power cables embedded in soil or exposed to moisture-rich environments are pointed out as problems to be aged by water treeing due to exterior moisture, ions, etc., and be thus shortened in lifespan. Insulators in which water treeing occurs are deteriorated in electrical insulation property, thus shortening lifespan of cables.

Since accidents often occur due to water treeing, a variety of methods for improving resistance against creation and growth of water trees have been suggested. Korean Patent No. 0561272 discloses prevention of water treeing using a glycidyl methacrylate-grafted copolymer and Japanese Patent Publication Hei 10-64339 and Japanese Patent Publication Sho 63-150811 disclose inhibition on generation and growth of water treeing through treatment of polyethylene modified with dialkyl disulfide and maleic anhydride.

However, these methods have still a disadvantage of not sufficiently inhibiting generation and growth of water trees.

DISCLOSURE

Technical Problem

Therefore, it is one object of the present invention to provide a cross-linked polyethylene composition which prevents generation and growth of water tree aging phenomenon by permeation of moisture and ions into insulators, and exhibits suitable cross-linking properties and superior electrical insulation property.

The object of the present invention can be accomplished by the present invention described below.

Technical Solution

In accordance with one aspect of the present invention, the above and other objects can be accomplished by the provision of a cross-linked polyethylene composition comprising (A) 100 parts by weight of a polyethylene base resin, (B) 0.1 to 0.6 parts by weight of a hindered phenol-based antioxidant, (C) 1 to 4 parts by weight of a crosslinking agent, (D) 0.2 to 1.9 parts by weight of magnesium oxide, and (E) 0.1 to 1.0 parts by weight of a scorch inhibitor.

In another aspect of the present invention, provided is a method for preparing a cross-linked polyethylene composition comprising (a) a first step of mixing 100 parts by weight of a polyethylene base resin with 0.1 to 0.6 parts by weight of a hindered phenol-based antioxidant, 1 to 4 parts by weight of a crosslinking agent, 0.2 to 1.9 parts by weight of magnesium oxide and 0.1 to 1.0 parts by weight of a scorch inhibitor, followed by extrusion and (b) a second step of cross-linking the extrudate obtained in the mixing and extrusion step (a) at a temperature higher than a decomposition temperature of the crosslinking agent.

In another aspect of the present invention, provided is a cable comprising the cross-linked polyethylene composition.

Advantageous Effects

The cross-linked polyethylene composition according to the present invention is effective in preventing generation and growth of water tree aging phenomenon by permeation of moisture and ions into insulators when power cable insulators are exposed to exterior moisture and electric fields, and exhibiting suitable cross-linking properties and superior electrical insulation property.

BEST MODE

The present invention provides a cross-linked polyethylene composition comprising (A) 100 parts by weight of a polyethylene base resin, (B) 0.1 to 0.6 parts by weight of a hindered phenol-based antioxidant, (C) 1 to 4 parts by weight of a crosslinking agent, (D) 0.2 to 1.9 parts by weight of magnesium oxide, and (E) 0.1 to 1.0 parts by weight of a scorch inhibitor.

In addition, the composition may further comprise 0.2 to 0.9 parts by weight of polyethylene glycol having a molar mass (g/mol) of 5,000 to 70,000 as a tree inhibitor, which inhibits generation and growth of water trees of cross-linked polyolefin.

The constituent components of the present invention will be described in more detail.

(A) Polyethylene Base Resin

The polyethylene base resin (A) according to the present invention is an ethylene homopolymer which is polymerized by free radical initiation reaction in a high-pressure tubular or autoclave reactor at a high pressure of 1,000 bar or more, or an ethylene copolymer which is prepared at a low pressure of 100 bar or less using a Ziegler-Natta catalyst or a metallocene catalyst.

The metallocene catalyst is an organometallic compound formed by ligand bond between a cyclopentadiene derivative and a Group 4b, 5b or 6b element, specifically, a transition metal such as titanium, zirconium, hafnium or vanadium of Group 4b or 5b on periodic table.

In addition, the ethylene copolymer employs α-olefin having 3 or more carbon atoms as a comonomer. Specifically, the α-olefin having 3 or more carbon atoms comprises at least one selected from the group consisting of propylene, 1-butene, 1-pentene, 1-hexene and 1-octene.

The polyethylene base resin according to the present invention comprises ultra low-density polyethylene, low-density polyethylene, linear low-density polyethylene and high-density polyethylene, and has a density of 0.87 to 0.96 g/cm$^3$, a melt index of 0.1 to 50 g/10 min and a weight average molecular weight (Mw) of 40,000 to 200,000, and specifically a density of 0.90 to 0.93 g/cm$^3$, a melt index of 0.5 to 10 g/10 min and a weight average molecular weight of 60,000 to 150,000, and more specifically, a density of 0.910 to 0.925 g/cm$^3$, a melt index of 1 to 5 g/10 min and a weight average molecular weight of 70,000 to 130,000.

(B) Antioxidant

The antioxidant (B) according to the present invention is a hindered phenol-based antioxidant which is a solid-state antioxidant and comprises at least one selected from 4,4'-thiobis(2-t-butyl-5-methylphenol), 2,2'-thio-diethyl bis-[3-(3,5-di-t-butyl-4-hydroxyphenyl)-propionate], pentaerythrityl-tetrakis-[3-(3,5-di-t-butyl-4-hydroxyphenyl)-propionate], 4,4'-thiobis(2-methyl-6-t-butylphenol), 2,2'-thiobis(6-t-butyl-4-methylphenol), octadecyl-[3-(3,5-di-t-butyl-4-hydroxyphenyl)-propionate], triethyleneglycol-bis-[3-(3-t-butyl-4-hydroxy-5-methylphenol)propionate], thiodiethylene bis[3-(3,5-di-t-butyl-4-hydroxyphenyl)propionate], 6,6'-di-t-butyl-2,2'-thiodi-p-cresol, 1,3,5-tris(4-t-butyl-3-hydroxy-2,6-xylyl)methyl-1,3,5-triazine-2,4,6-(1H,3H,5H)-trione and dioctadecyl 3,3'-thiodipropionate. Specifically, the solid-phase antioxidant is 4,4'-thiobis(2-t-butyl-5-methylphenol), but the present invention is not limited thereto.

The antioxidant is used in an amount of 0.1 to 0.6 parts by weight, specifically of 0.1 to 0.5 parts by weight, more specifically, of 0.1 to 0.4 parts by weight, with respect to 100 parts by weight of the polyethylene base resin. When the amount of antioxidant used is lower than 0.1 parts by weight, cable insulators cannot be sufficiently protected from oxidation and long-term aging properties are thus deteriorated, and when the amount is higher than 0.6 parts by weight, high-temperature thermal deformation is caused due to bad cross-linking properties of cables and long-term safety of the cables is thus deteriorated.

(C) Crosslinking Agent

The crosslinking agent (C) used in the present invention functions to form a cross-linking initiation point in a base resin and the content thereof is 1 to 4 parts by weight, specifically, 1 to 3 parts by weight, more specifically, 1 to 2.5 parts by weight, with respect to 100 parts by weight of the polyethylene base resin. When the content of the crosslinking agent is lower than 1 part by weight, the crosslinking agent does not provide cross-linking property and when the content is higher than 4 parts by weight, long-term workability is deteriorated.

The crosslinking agent that can be used for the present invention comprises at least one selected from the group consisting of dicumyl peroxide (DCP), benzoyl peroxide, lauryl peroxide, tert-butyl cumyl peroxide, di(tert-butyl peroxy isopropyl)benzene, 2,5-dimethyl-2,5-di(tert-butyl peroxy)hexane and di-tert-butyl peroxide, but the present invention is not limited thereto. Specifically, dicumyl peroxide is used.

(D) Magnesium Oxide

The magnesium oxide (D) used in the present invention functions to improve insulation property, reduce space charge and enhance water tree resistance and is used in an amount of 0.2 to 1.9 parts by weight, specifically, of 0.2 to 1.5 parts by weight, more specifically, of 0.3 to 1.0 parts by weight, with respect to 100 parts by weight of the polyethylene base resin. When the content of magnesium oxide is lower than 0.2 parts by weight, water tree inhibition is insufficient, and when the content thereof is higher than 1.9 parts by weight, photoaging properties of cable insulators are remarkably deteriorated, commercial and economic efficiency is low and electrical insulation property is deteriorated. The water tree resistance is also not further improved when the content of magnesium oxide is 1.0 part by weight or more. The magnesium oxide may be surface-treated with vinyl silane so as to improve dispersibility in resins.

The magnesium oxide is present as nano-particles with a mean particle size smaller than 1 μm. When the particle size of the magnesium oxide is greater than 1 μm, electrical insulation property is deteriorated and mechanical properties are deteriorated. In addition, when the magnesium oxide according to the present invention is used for direct-current cable insulators, performance of cables can be improved based on increase in volume resistivity, charge trapping caused by electrical potential well and space charge reduction. In addition, specifically, magnesium oxide may have a cubic, laminate or spherical shape.

(E) Scorch Inhibitor

The scorch inhibitor (E) according to the present invention comprises at least one selected from the group consisting of 2,4-diphenyl-4-methyl-1-pentene, 1,4-hydroquinone and hydroquinone derivatives, but the present invention is not limited thereto. Specifically, 2,4-diphenyl-4-methyl-1-pentene is used.

The scorch inhibitor (E) functions to increase cross-linking efficiency of the crosslinking agent and improve scorch resistance and the content thereof is 0.1 to 1.0 part by weight, specifically, 0.2 to 0.8 parts by weight, with respect to 100 parts by weight of the polyethylene base resin. When the content of the scorch inhibitor is lower than 0.1 parts by weight, cross-linking facilitation is insufficient and when the content is higher than 1.0 part by weight, cross-linking efficiency is deteriorated.

When the scorch inhibitor (E) is treated together with a tree inhibitor without using magnesium oxide (D), water tree resistance is deteriorated (see Comparative Examples 4 and 5), and when the scorch inhibitor (E) is used in conjunction with the magnesium oxide (D) at the following ratio, there is synergistic effect and properties such as water tree resistance are thus greatly improved. A weight ratio of the scorch inhibitor (E) and the magnesium oxide (D) is 1:0.3 to 1:4, in an embodiment, 1:0.5 to 1:3 and in another embodiment, 1:0.7 to 1:2.5.

(F) Tree Inhibitor

The tree inhibitor according to the present invention is polyethylene glycol having a molar mass (g/mol) of 5,000 to 70,000. The content of the tree inhibitor is 0.2 to 2.0 parts by weight, with respect to 100 parts by weight of the polyethylene base resin. When the content of polyethylene glycol is lower than 0.2 parts by weight, inhibition of water tree is not provided, and when the content thereof is higher than 2.0 parts by weight, photoaging and mechanical properties of cable insulators are remarkably deteriorated and commercial economic property is degraded.

The present invention provides a method for preparing a cross-linked polyethylene composition comprising a first step of mixing and extruding 100 parts by weight of a polyethylene base resin with 0.1 to 0.6 parts by weight of a hindered phenol-based antioxidant, 1 to 4 parts by weight of a crosslinking agent, 0.2 to 1.9 parts by weight of magnesium oxide and 0.1 to 1.0 parts by weight of a scorch inhibitor and cross-linking the resulting extrudate at a temperature higher than a decomposition temperature of the crosslinking agent.

In addition, the composition may further comprise 0.2 to 0.9 parts by weight of polyethylene glycol having a molar mass (g/mol) of 5,000 to 70,000 as a tree inhibitor, which inhibits generation and growth of water trees of cross-linked polyolefin.

The cross-linked polyethylene composition may further comprise the tree inhibitor. A weight ratio of the magnesium oxide and the tree inhibitor is 1:2 to 1:0.1, in an embodiment, 1:1.8 to 1:0.3, and in another embodiment, 1:1.7 to 1:0.5.

The first step of the mixing and extruding the components may be carried out by a common mixing method and a common polymer processing method. In particular, the method comprises (a) a master batch comprising a combination of an antioxidant mixture and polyethylene glycol, or a combination of an antioxidant mixture, polyethylene glycol and a crosslinking agent, and (b) adding polyethylene or a combination of polyethylene and a crosslinking agent to an extruder, adding the master batch obtained in the step (a) to the extruder or directly adding respective additives to the extruder, followed by extrusion.

The mixing step (a) is preferably carried out using a Banbury mixer as a twin-screw mixer and a twin-screw extrusion mixer (roll mill) and the extrusion step (b) is preferably carried out using a twin-screw extruder or a mono-screw extruder with mixing function.

In addition, the present invention provides a cable comprising the cross-linked polyethylene composition.

A structure of the cable according to an embodiment of the present invention will be described in detail. The cable, in particular, a power cable generally has a structure including a conductive layer, a semi-conductive layer, an insulating layer, a neutral conductor and an outer layer, and the conductive layer includes an inner semi-conductive layer surrounding the conductive layer and an outer semi-conductive layer surrounding the insulating layer. In addition, the cross-linked polyethylene composition layer according to the present invention forms the insulating layer. Meanwhile, the neutral conductor is protected by neutral shielding layers disposed in inner and outer regions thereof and the outer layer is present at the periphery of the cable.

The cable according to the present invention is designed such that the conductive layer or the inner semi-conductive layer is coated with the cross-linked polyethylene composition layer.

Hereinafter, preferred examples will be provided for better understanding of the present invention. These examples are only provided to illustrate the present invention and it will be apparent to those skilled in the art that various modifications and alternations are possible within the scope and technical range of the present invention. Such modifications and alternations fall within the scope of claims included herein.

EXAMPLE

Example 1

100 parts by weight of low-density polyethylene (produced by LG CHEM. LTD., LUTENE® CB2030, weight average molecular weight: 90,000 to 120,000) having a density of 0.921 g/cm$^3$ and a melt index of 2.0 g/10 min was mixed with 2 parts by weight of dicumyl peroxide (DCP) as a crosslinking agent, 0.3 parts by weight of 4,4'-thiobis(2-t-butyl-5-methylphenol) as an antioxidant, 0.4 parts by weight of 2,4-diphenyl-4-methyl-1-pentene as a scorch inhibitor and 0.3 parts by weight of magnesium oxide surface-treated with silane in a Banbury mixer at a temperature of 120 to 140° C., followed by pelletization. The following test was performed on the pellet thus obtained and physical properties thereof were measured and are shown in Table 1 below.

Examples 2 to 6

The same process as Example 1 was performed except that the components were respectively added in amounts in parts by weight shown in Table 1 below.

Comparative Example 1

The same process as Example 1 was performed except that 2,4-diphenyl-4-methyl-1-pentene was not added as the scorch inhibitor and measurement results of physical properties are shown in Table 1.

Comparative Example 2

The same process as Example 4 was performed except that 2,4-diphenyl-4-methyl-1-pentene was not added as the scorch inhibitor and measurement results of physical properties are shown in Table 1.

Examples 7 to 9

The same process as Example 1 was performed except that the components were respectively added in amounts in parts by weight shown in Table 3 below and measurement results of physical properties are shown in Table 3.

Comparative Examples 3 to 7

The same process as Example 1 was performed except that the components were respectively added in amounts in parts by weight shown in Table 2 below and measurement results of physical properties are shown in Table 2.

Comparative Examples 8 to 10

The same process as Example 1 was performed except that the components were respectively added in amounts in parts by weight shown in Table 3 below and measurement results of physical properties are shown in Table 3.

Test Example

1. Degree of Cross-Linking 0.2 to 0.3 g of a specimen thinly sliced was added to a boiling xylene solution, followed by reflux for 24 hours. Then, the remaining specimen was weighed and a degree of cross-linking is calculated by the following Equation 1.

$$\text{Degree of crosslinking}(\%) = \frac{\text{Weight of specimen before treatment} - \text{weight of specimen after treatment}}{\text{Weight of specimen before treatment}} \quad \text{Equation 1}$$

-continued $$\text{Degree of crosslinking (\%)} = \frac{\text{Weight of sample before treatment} - \text{weight of sample after treatment}}{\text{Weight of sample before treatment}} \times 100$$

$$\text{Degree of crosslinking (\%)} = \frac{\text{Weight of specimen before treatment} - \text{weight of specimen after treatment}}{\text{Weight of specimen before treatment}} \times 100$$

2. Hot Elongation

Variation in length of a specimen measured at 200° C./15 min and at a load of 20N/cm² in accordance with the method described in IEC 811 was expressed as a percentage (%).

3. Room Temperature Tensile Strength and Elongation

Room temperature tensile strength and elongation were measured using a universal test machine (UTM) in accordance with the method described in IEC 811.

4. Tensile Strength and Elongation after Aging

Tensile strength and elongation after aging were measured using a universal test machine (UTM) in accordance with the method described in IEC 811 after aging in an air oven at 135° C./30 days.

5. Scorch Resistance

Scorch resistance was measured at 160° C. at a 0.5° arc and at a frequency of 50 rpm for 12 minutes, and a time for which a maximum torque appeared when a sample was completely cross-linked reached 90% was measured and expressed in minutes or seconds.

6. Electrical Insulation Property

Cross-linkage was performed at a temperature of 180° C. for 15 minutes to produce a sheet having a thickness of 0.3 mm and dielectric breakdown strength was measured by alternating current (AC) voltage withstand testing.

Inhibition of water treeing in the present invention was evaluated from the length of water tree measured with the passage of a predetermined time (30 days) in accordance with ASTM D6097.

Figure 1A:
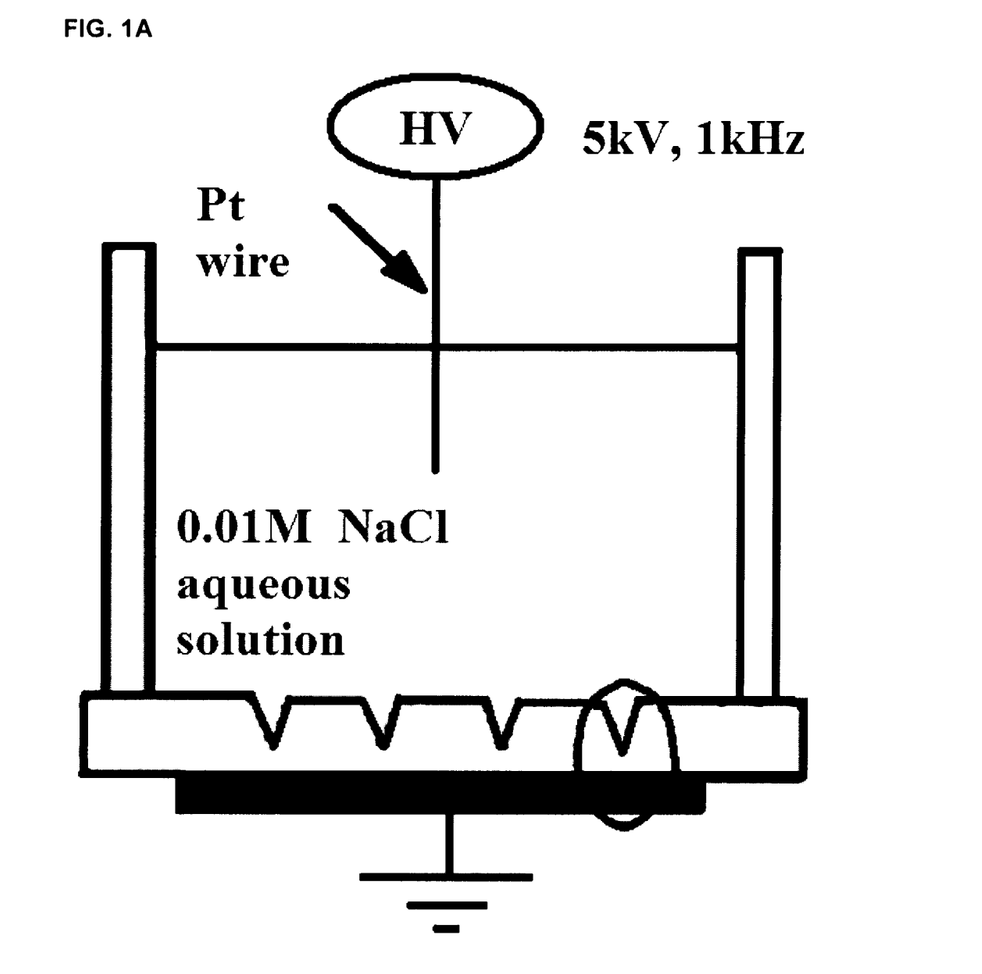
FIG. 1A is a view schematically illustrating an accelerated water tree aging testing device for measuring average tree length according to an embodiment of the present invention.
Figure 1B:
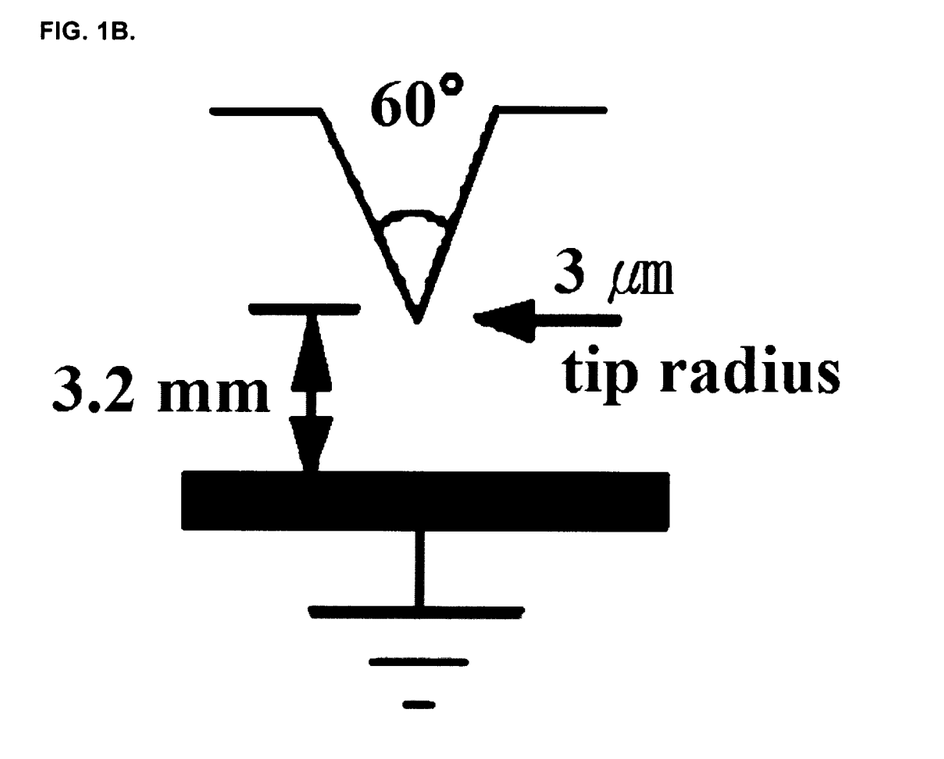
FIG. 1B is a view schematically illustrating a pin insertion machine for measuring average tree length according to an embodiment of the present invention.

The water tree length was measured using an accelerated water tree aging testing device as shown in FIG. 1A and the test conditions were as follows. A specimen molded into a plate was inserted into a pin insertion machine admitting injection of conical pins as shown in FIG. 1B, and the specimen was continuously inserted until it reached a position at a distance of 3.2 mm from a tip of the specimen and was pressed at 180° C. to produce a specimen for measuring cross-linked water tree. An angle of the pin used herein was 60° and a radius of the pin tip was 3 μm.

A 0.01M sodium chloride (NaCl) solution was added to the specimen obtained by the process, a platinum wire of 50 mm in length was connected to the specimen and water tree length was measured at an AC voltage of 5 kV for 720 hours. A length of the grown water tree was obtained by thinly slicing the specimen and measuring a length of the final water tree using an optical microscope. The measured water tree length was an average of all measured lengths of the specimen.

7. Water Tree Growth Rate

Water tree growth rate was calculated by applying the water tree length measured in accordance with ASTM D6097 to the following equation:

$$\text{Water tree growth rate} = L_2/L_1$$

wherein $L_1$ represents the distance (3.2 mm) from a notch of a specimen tip to the surface provided at an opposite side of the specimen and $L_2$ represents a length of water tree grown from the notch of the specimen tip to the surface provided at the opposite side of the specimen.

TABLE 1

|  | Ex. 1 | Ex. 2 | Ex. 3 | Ex. 4 | Ex. 5 | Ex. 6 | Comp. Ex. 1 | Comp. Ex. 2 |
|---|---|---|---|---|---|---|---|---|
| Low-density polyethylene[1] (parts by weight) | 100 | 100 | 100 | 100 | 100 | 100 | 100 | 100 |
| Crosslinking agent[2] (parts by weight) | 2.0 | 2.0 | 2.0 | 2.0 | 2.0 | 2.0 | 2.0 | 2.0 |
| Antioxidant[3] (parts by weight) | 0.3 | 0.3 | 0.3 | 0.3 | 0.3 | 0.3 | 0.3 | 0.3 |
| Scorch inhibitor[4] (parts by weight) | 0.4 | 0.4 | 0.4 | 0.4 | 0.4 | 0.4 | — | — |
| Magnesium oxide (parts by weight) | 0.3 | 0.5 | 1.0 | 0.3 | 0.5 | 1.0 | 0.3 | 0.3 |
| Tree inhibitor[5] (parts by weight) |  |  |  | 0.5 | 0.5 | 0.5 |  | 0.5 |
| Degree of cross-linking (%) | 83 | 82 | 82 | 84 | 84 | 83 | 80 | 81 |
| Hot elongation (%) | 68 | 71 | 72 | 68 | 69 | 72 | 75 | 75 |
| Room-temperature tension (kg/cm²) | 231 | 229 | 224 | 220 | 218 | 215 | 247 | 230 |

TABLE 1-continued

|  | Ex. 1 | Ex. 2 | Ex. 3 | Ex. 4 | Ex. 5 | Ex. 6 | Comp. Ex. 1 | Comp. Ex. 2 |
|---|---|---|---|---|---|---|---|---|
| Room temperature elongation (%) | 560 | 555 | 547 | 537 | 533 | 526 | 575 | 573 |
| Tension after aging (kg/cm$^2$) | 227 | 226 | 217 | 215 | 212 | 208 | 232 | 219 |
| Elongation after aging (%) | 552 | 554 | 543 | 530 | 526 | 521 | 555 | 534 |
| Scorch resistance (min:sec) | 10:49 | 10:44 | 10:46 | 10:57 | 10:57 | 10:59 | 8:1 | 8:40 |
| Insulation property (kV/mm) | 75 | 76 | 75 | 77 | 76 | 76 | 76 | 75 |
| Average tree length (μm) | 290 | 212 | 191 | 259 | 205 | 180 | 287 | 285 |
| Water tree growth rate | 0.09 | 0.07 | 0.06 | 0.08 | 0.06 | 0.06 | 0.09 | 0.09 |

Note:
[1] Low-density polyethylene: produced by LG CHEM. LTD. (LUTENE ® CB2030)
[2] Crosslinking agent: dicumyl peroxide (DCP)
[3] Antioxidant: 4,4'-thiobis(2-t-butyl-5-methylphenol)
[4] Scorch inhibitor: 2,4-diphenyl-4-methyl-1-pentene
[5] Tree inhibitor: polyethylene glycol

TABLE 2

|  | Comp. Ex. 3 | Comp. Ex. 4 | Comp. Ex. 5 | Comp. Ex. 6 | Comp. Ex. 7 |
|---|---|---|---|---|---|
| Low-density polyethylene[1] (parts by weight) | 100 | 100 | 100 | 100 | 100 |
| Crosslinking agent[2] (parts by weight) | 2.0 | 2.0 | 2.0 | 2.0 | 2.0 |
| Antioxidant[3] (parts by weight) | 0.3 | 0.3 | 0.3 | 0.3 | 0.3 |
| Scorch inhibitor[4] (parts by weight) | — | — | 0.4 | 0.4 | 0.4 |
| Magnesium oxide (parts by weight) | — | — | — | 0.1 | 2.0 |
| Tree inhibitor[5] (parts by weight) | — | 0.5 | 0.5 | 0.5 | 0.5 |
| Room-temperature tension (kg/cm$^2$) | 251 | 242 | 227 | 223 | 209 |
| Room-temperature elongation (%) | 578 | 576 | 557 | 541 | 520 |
| Tension after aging (kg/cm$^2$) | 228 | 232 | 219 | 217 | 74 |
| Elongation after aging (%) | 553 | 555 | 541 | 538 | Break |
| Scorch resistance (min:sec) | 8:04 | 8:42 | 10:48 | 10:47 | 10:46 |
| Insulation property (kV/mm) | 79 | 76 | 75 | 75 | 60 |
| Average tree length (μm) | 555 | 289 | 361 | 360 | 216 |
| Water tree growth rate | 0.17 | 0.09 | 0.11 | 0.11 | 0.07 |

Note:
[1] low-density polyethylene: produced by LG CHEM. LTD. (LUTENE ® CB2030)
[2] Crosslinking agent: dicumyl peroxide (DCP)
[3] Antioxidant: 4,4'-thiobis(2-t-butyl-5-methylphenol)
[4] Scorch inhibitor: 2,4-diphenyl-4-methyl-1-pentene
[5] Tree inhibitor: polyethylene glycol

TABLE 3

|  | Ex. 7 | Ex. 8 | Ex. 9 | Comp. Ex. 8 | Comp. Ex. 9 | Comp. Ex. 10 |
|---|---|---|---|---|---|---|
| Low-density polyethylene[1] (parts by weight) | 100 | 100 | 100 | 100 | 100 | 100 |
| Crosslinking agent[2] (parts by weight) | 2.0 | 2.0 | 2.0 | 2.0 | 2.0 | 2.0 |
| Antioxidant B[3] (parts by weight) | 0.3 | — | — | 0.05 | — | — |
| Antioxidant C[4] (parts by weight) | — | 0.3 | — | — | 0.05 | — |
| Antioxidant D[5] (parts by weight) | — | — | 0.3 | — | — | 0.05 |
| Scorch inhibitor[6] (parts by weight) | 0.4 | 0.4 | 0.4 | 0.4 | 0.4 | 0.4 |
| Magnesium oxide (parts by weight) | 1.0 | 1.0 | 1.0 | 1.0 | 1.0 | 1.0 |
| Degree of cross-linking (%) | 87.23 | 84.70 | 85.63 | 88.18 | 78.91 | 87.22 |
| Hot elongation (%) | 80 | 85 | 110 | 95 | 99 | 121 |
| Room-temperature tension (kg/cm$^2$) | 226 | 223 | 228 | 231 | 224 | 225 |
| Room temperature elongation (%) | 545 | 552 | 548 | 539 | 544 | 547 |
| Tension after aging (kg/cm$^2$) | 192 | 201 | 210 | 38 | 41 | 47 |
| Elongation after aging (%) | 530 | 522 | 526 | Break | Break | Break |

TABLE 3-continued

|  | Ex. 7 | Ex. 8 | Ex. 9 | Comp. Ex. 8 | Comp. Ex. 9 | Comp. Ex. 10 |
|---|---|---|---|---|---|---|
| Scorch resistance (min:sec) | 6.14 | 8.29 | 8.19 | 4.26 | 6.14 | 6.41 |

Note:
[1] Low-density polyethylene: produced by LG CHEM. LTD. (LUTENE ® CB2030)
[2] Crosslinking agent: dicumyl peroxide (DCP)
[3] Antioxidant B: thiodiethylene bis[3-(3,5-di-t-butyl-4-hydroxyphenyl)propionate]
[4] Antioxidant C: 6,6'-di-t-butyl-2,2'-thiodi-p-cresol
[5] Antioxidant D: 1,3,5-tris(4-t-butyl-3-hydroxy-2,6-xylyl)methyl-1,3,5-triazine-2,4,6-(1H,3H,5H)-trione
[6] Scorch inhibitor: 2,4-diphenyl-4-methyl-1-pentene As can be seen from Tables 1 and 2, the cross-linked polyethylene compositions according to Examples 1 and 4 of the present invention comprising a scorch inhibitor in an amount in parts by weight defined herein exhibit greatly improved scorch resistance and enhanced cross-linking property, as compared to Comparative Examples 1 and 2. In addition, from comparison of Examples 1 and 4 with Comparative Examples 1 to 5, it can be seen that water tree property is deteriorated when a tree inhibitor and a scorch inhibitor are used in absence of magnesium oxide, while water tree property is improved due to synergistic effects when used in conjunction with the magnesium oxide.

As can be seen from Tables 1 and 2, the cross-linked polyethylene compositions according to Examples 1 to 6 of the present invention comprising magnesium oxide in amounts in parts by weight defined herein exhibit considerably superior resistance to water tree and maintain electrical insulation property, as compared to Comparative Examples 3 to 5. Comparative Example 6 comprising magnesium oxide in an amount of less than 0.3 parts by weight exhibits insufficient water tree inhibition property and Comparative Example 7 comprising magnesium oxide in an amount greater than 1.0 part by weight remarkably deteriorates photoaging properties of cable insulators and deteriorates electrical insulation property. In addition, the cross-linked polyethylene compositions according to Examples 1 to 3 comprising magnesium oxide in amounts of parts by weight defined herein and not comprising the tree inhibitor exhibit considerably superior photoaging property, as compared to Comparative Examples 4 to 6, and exhibit superior water tree property and excellent photoaging property, as compared to Comparative Example 5 using only a tree inhibitor. As apparent from these two cases, magnesium oxide more effectively inhibits water tree and is advantageous in terms of photoaging property, as compared to a conventional tree inhibitor.

As can be seen from Tables 1 and 3, the cross-linked polyethylene compositions according to Examples 1 to 9 of the present invention comprising the antioxidant in amounts in parts by weight defined herein exhibit considerably superior long-term photoaging property, as compared to Comparative Examples 8 to 10. In addition, from comparison between Example 3 and Examples 7 to 9 comprising an antioxidant in amounts of parts by weight defined herein in terms of the type of the antioxidant, it can be seen that 4,4'-thiobis(2-t-butyl)-5-methylphenol exhibits the most superior long-term photoaging property.

What is claimed is:
1. A cross-linked polyethylene composition for a power cable insulator comprising:
(A) 100 parts by weight of a polyethylene base resin;
(B) 0.1 to 0.6 parts by weight of a hindered phenol-based antioxidant;
(C) 1 to 4 parts by weight of a crosslinking agent;
(D) 0.2 to 1.0 parts by weight of magnesium oxide surface treated with silane, which has an average particle size of less than 1 μm; and
(E) 0.1 to 1.0 parts by weight of a scorch inhibitor,
wherein the polyethylene base resin (A) is an ethylene homopolymer polymerized by a free radical initiation reaction at a high pressure of 1,000 bar or more in a high-pressure tubular or autoclave reactor,
wherein the hindered phenol-based antioxidant (B) is the only antioxidant included in the composition, and the hindered phenol-based antioxidant (B) is only one compound selected from the group consisting of 4,4'-thiobis(2-t-butyl-5-methylphenol), 2,2'-thio diethyl bis-[3-(3,5-di-t-butyl-4-hydroxyphenyl)-propionate], pentaerythrityl-tetrakis-[3-(3,5-di-t-butyl-4-hydroxyphenyl)-propionate], 4,4'-thiobis(2-methyl-6-t-butylphenol), 2,2'-thiobis(6-t-butyl-4-methylphenol), octadecyl-[3-(3,5-di-t-butyl-4-hydroxyphenyl)-propionate], triethyleneglycol-bis-[3-(3-t-butyl-4-hydroxy-5-methylphenol)propionate], thiodiethylene bis[3-(3,5-di-t-butyl-4-hydroxyphenyl)propionate], 6,6'-di-t-butyl-2,2'-thiodi-p-cresol, 1,3,5-tris(4-t-butyl-3-hydroxy-2,6-xylyl)methyl-1,3,5-triazine-2,4,6-(1H, 3H,5H)-trione and dioctadecyl 3,3'-thiodipropionate,
wherein a weight ratio of the scorch inhibitor (E) to the magnesium oxide surface-treated with silane (D) is 1:0.3 to 1:4, and
wherein the cross-linked polyethylene composition has a water tree growth rate of 0.1 or less measured by ASTM D6097.

2. The cross-linked polyethylene composition according to claim 1, further comprising: a tree inhibitor,
wherein a weight ratio of the magnesium oxide surface-treated with silane to the tree inhibitor is 1:2 to 1:0.1.

3. The cross-linked polyethylene composition according to claim 1, further comprising: 0.2 to 0.9 parts by weight of polyethylene glycol having a molar mass (g/mol) of 5,000 to 70,000, with respect to 100 parts by weight of the polyethylene base resin.

4. The cross-linked polyethylene composition according to claim 1, wherein the polyethylene base resin (A) has a density of 0.87 to 0.96 g/cm$^3$, a melt index of 0.1 to 50 g/10 min and a weight average molecular weight of 40,000 to 200,000.

5. The cross-linked polyethylene composition according to claim 1, wherein the crosslinking agent (c) comprises at least one selected from the group consisting of dicumyl peroxide, benzoyl peroxide, lauryl peroxide, tert-butyl cumyl peroxide, di(tert-butyl peroxy isopropyl) benzene, 2,5-dimethyl-2,5-di(tert-butyl peroxy)hexane and di-tert-butyl peroxide.

6. The cross-linked polyethylene composition according to claim 1, wherein the scorch inhibitor comprises at least one selected from the group consisting of 2,4-diphenyl-4-methyl-1-pentene, 1,4-hydroquinone and hydroquinone derivatives.

7. A cable comprising the cross-linked polyethylene composition according to claim 1, and having a water tree growth rate of 0.1 or less measured by ASTM D6097, upon coating a conductive layer or a semi-conductive layer.

8. A method for preparing a cross-linked polyethylene composition comprising:

a first step of mixing 100 parts by weight of a polyethylene base resin with 0.1 to 0.6 parts by weight of a hindered phenol-based antioxidant, 1 to 4 parts by weight of a crosslinking agent, 0.2 to 1.0 parts by weight of magnesium oxide surface treated with silane which has an average particle size of less than 1 μm, and 0.1 to 1.0 parts by weight of a scorch inhibitor, followed by extrusion; and a second step of cross-linking the extrudate obtained in the mixing and extrusion step at a temperature higher than a decomposition temperature of the crosslinking agent, to prepare a cross-linked polyethylene composition for a power cable insulator having a water tree growth rate of 0.1 or less measured by ASTM D6097, wherein the polyethylene base resin is an ethylene homopolymer polymerized by a free radical initiation reaction at a high pressure of 1,000 bar or more in a high-pressure tubular or autoclave reactor, wherein the hindered phenol-based antioxidant is the only antioxidant included in the composition, and the hindered phenol-based antioxidant is only one compound selected from the group consisting of 4,4'-thiobis(2-t-butyl-5-methylphenol), 2,2'-thio diethyl bis-[3-(3,5-di-t-butyl-4-hydroxyphenyl)-propionate], pentaerythrityl-tetrakis-[3-(3,5-di-t-butyl-4-hydroxyphenyl)-propionate], 4,4'-thiobis(2-methyl-6-t-butylphenol), 2,2'-thiobis(6-t-butyl-4-methylphenol), octadecyl-[3-(3,5-di-t-butyl-4-hydroxyphenyl)-propionate], triethyleneglycol-bis-[3-(3-t-butyl-4-hydroxy-5-methylphenol)propionate], thiodiethylene bis[3-(3,5-di-t-butyl-4-hydroxyphenyl)propionate], 6,6'-di-t-butyl-2,2'-thiodi-p-cresol, 1,3,5-tris(4-t-butyl-3-hydroxy-2,6-xylyl)methyl-1,3,5-triazine-2,4,6-(1H,3H,5H)-trione and dioctadecyl 3,3'-thiodipropionate, and wherein a weight ratio of the scorch inhibitor to the magnesium oxide surface-treated with silane is 1:0.3 to 1:4.

9. The method according to claim 8, wherein the first step comprises:
   (a) preparing a master batch comprising a combination of the antioxidant and polyethylene glycol, or a combination of the antioxidant, polyethylene glycol and a crosslinking agent; and
   (b) adding polyethylene or a combination of polyethylene and a crosslinking agent to an extruder and then adding the master batch obtained in the step (a) to the extruder or directly adding respective additives to the extruder, followed by extrusion.

* * * * *